Jan. 1, 1929.  1,697,054

E. DEODATO

APPARATUS EMPLOYING GASIFIED LIQUID FUEL

Filed Jan. 25, 1927

E. Deodato
INVENTOR

By: Marks & Clark
ATTYS.

Patented Jan. 1, 1929.

1,697,054

UNITED STATES PATENT OFFICE.

EDOUARD DEODATO, OF ALEXANDRIA, EGYPT.

APPARATUS EMPLOYING GASIFIED LIQUID FUEL.

Application filed January 25, 1927, Serial No. 163,507, and in France January 27, 1926.

My invention relates to heating apparatus employing gasified liquid fuel such as gasoline, of the known type in which the said fuel which is contained in a suitable receptacle is supplied to the burner by pressure which is directly exercised upon the upper surface of the liquid by compressed air which is actually furnished by an air pump provided upon the said receptacle.

This type of apparatus offers certain defects due to the fact that the compressed air, which is always mixed with vapour from the surface of the fuel in direct contact with the air, is directly exposed to the heat radiated by the burner, and it may thus be heated to temperatures which might cause the explosion of the detonating mixture which is formed by the fuel vapour and the air.

My invention has for its object to obviate such defects inherent in this class of apparatus, and for this purpose I provide the improvements which consist essentially in protecting the compressed air by a layer of the liquid fuel, of sufficient thickness, which constantly fills a suitable jacket provided upon the part of the receptacle which is exposed to the radiation from the burner, whereby the said mixture of air and fuel vapour will be protected from the radiation of the burner and all danger of explosion will thus be obviated.

The following description with reference to the appended drawings which are given by way of example shows an embodiment of the said invention.

Figure 1:
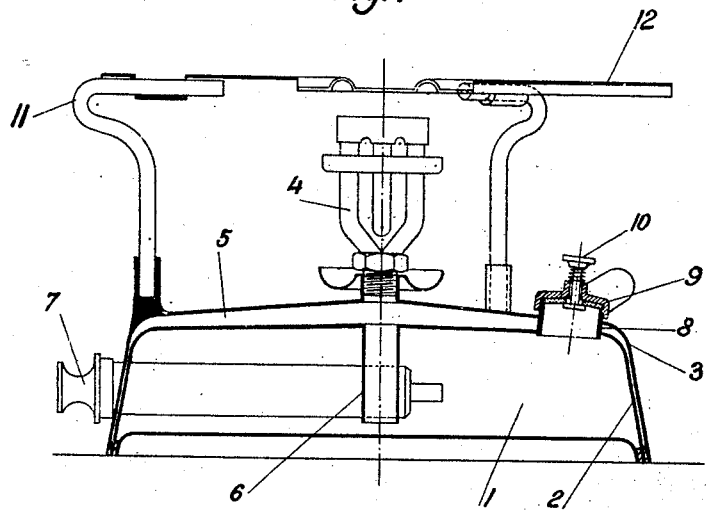
Fig. 1 is a vertical axial section of an improved heating apparatus in accordance with the invention.
Figure 2:
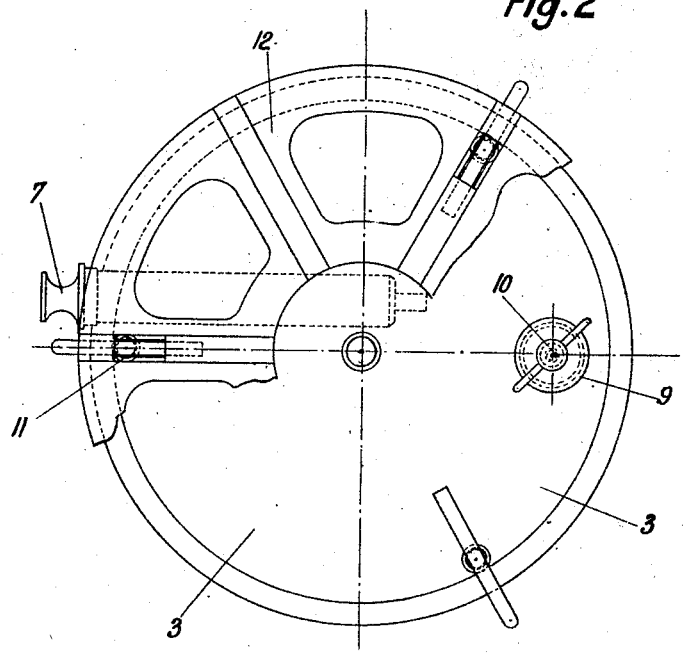
Fig. 2 is the corresponding plan view, with the burner removed.

In these figures, 1 is the fuel receptacle of adequate form, to whose wall 2 is attached preferably by autogenous welding a second wall 3 the shape of which is such as to provide a protecting jacket 5 at the upper part, which is exposed to the radiation from the burner 4, and also between the two walls 2—3; the said jacket is connected with the receptacle 1 by a tube 6 and is constantly filled with liquid, so that the air mixed with fuel vapour which is situated above the liquid in the receptacle 1 will be protected from the radiation of the burner 4; 7 is an air pump which is secured for instance by soldering to the walls 2 and 3; 8 is a filling orifice for the apparatus which is provided with a cover 9 and a valve for regulating the pressure and also the extinguishing of the device; 11 are the supports and 12 the grid which is mounted thereon.

The operation of the improved apparatus is as follows:—The receptacle 1 is partly filled with liquid fuel through the orifice 8, and an air pressure upon the liquid is obtained by means of the pump 7; this pressure acts upon the upper part of the fuel in the receptacle and drives it through the tube 6 into the protecting jacket 5, so that the latter will be constantly filled with liquid fuel, and in this manner the heat radiated by the burner 4 will have little or no effect upon the air, mixed with vapour, which is situated at the upper part of the receptacle 1, since the heat is obliged to pass through the protecting layer of liquid.

It is found that the double walls 2 and 3 in addition to constituting a jacket in effect provide a secondary receptacle for accommodating the liquid.

Obviously, the said apparatus is susceptible of all necessary improvements and modifications in detail without departing from the principle of the invention.

What I claim is:

1. A device of the character described, including a liquid containing receptacle, a second receptacle above the top thereof and in communication therewith at a point adjacent the bottom thereof, a burner supported above the second receptacle, and means operable to place the liquid in the liquid containing receptacle under pressure so that some of the liquid is continuously maintained in the second receptacle.

2. A device of the character described, including a liquid fuel containing receptacle having a double wall forming a jacketed top, a tube depending from the inner wall of the top to a point adjacent the bottom of the receptacle, a burner rising from the upper wall, and means for injecting air under pressure into the liquid containing receptacle so that some of the liquid is continuously contained in the jacketed top so as to prevent heating the air in the inner part of the receptacle, substantially as and for the purposes set forth.

In testimony whereof I affix my signature.

EDOUARD DEODATO.